United States Patent [19]

Selph

[11] 4,445,036

[45] Apr. 24, 1984

[54] SOLID STATE FAST-NEUTRON SPECTROMETER/DOSIMETER AND DETECTOR THEREFOR

[75] Inventor: Wade E. Selph, Del Mar, Calif.

[73] Assignee: IRT Corporation, San Diego, Calif.

[21] Appl. No.: 256,018

[22] Filed: Apr. 21, 1981

[51] Int. Cl.³ .................... G01T 1/22; G01T 3/00
[52] U.S. Cl. .................... 250/370; 250/390
[58] Field of Search .......... 250/336, 370, 371, 390, 250/391, 392; 357/8, 29; 376/254, 255

[56] References Cited

U.S. PATENT DOCUMENTS

| | | | |
|---|---|---|---|
| 3,227,876 | 1/1966 | Ross | 250/83.1 |
| 3,428,892 | 2/1969 | Meinhard | 357/29 |
| 3,576,439 | 4/1971 | Figueron | 250/83.3 |
| 3,609,478 | 9/1971 | King | 317/235 |
| 3,748,422 | 7/1973 | Schafer | 219/10.53 |
| 3,879,612 | 4/1975 | Foster et al. | 250/370 |
| 3,896,306 | 7/1975 | Becker et al. | 250/392 |
| 3,999,071 | 8/1975 | Stiffert et al. | 250/370 |
| 4,000,502 | 12/1976 | Butler et al. | 357/15 |
| 4,074,136 | 2/1978 | Heinzelmann et al. | 250/392 |
| 4,103,165 | 7/1978 | Brown et al. | 250/390 |
| 4,119,852 | 10/1978 | Rougeot | 250/370 |
| 4,163,240 | 7/1979 | Swinehart et al. | 357/29 |
| 4,175,982 | 11/1979 | Loutfy et al. | 357/8 |
| 4,204,216 | 5/1980 | Heeger et al. | 357/8 |
| 4,210,805 | 7/1980 | Kobayashi et al. | 250/370 |
| 4,217,497 | 8/1980 | Daniels et al. | 250/369 |

Primary Examiner—Janice A. Howell
Attorney, Agent, or Firm—Fitch, Even, Tabin & Flannery

[57] ABSTRACT

A solid state fast-neutron spectrometer/dosimeter and a detector therefor are presented. The detector comprises a substrate of organic semiconductor material and a coating of a nuclearly inert metal with a Fermi level greater than that of the substrate, the metal being applied so as to form a rectifying barrier with the substrate. Multi-substrate detector embodiments provide greater sensitivity and precision in an incorporating spectrometer/dosimeter. A pulse height analyzer is used to obtain a pulse height distribution from the output of the detector. The pulse height distribution may be converted by means of a microcomputer to yield a neutron energy distribution for spectrometer applications, or a total neutron energy reading for dosimeter applications.

8 Claims, 6 Drawing Figures

SOLID STATE FAST-NEUTRON SPECTROMETER/DOSIMETER AND DETECTOR THEREFOR

BACKGROUND OF THE INVENTION

The present invention relates generally to a solid state fast-neutron spectrometer/dosimeter and a detector therefor. More particularly it relates to a fast neutron detector formed of a substrate of organic semiconductor material coated with a metallic layer forming a Schottky barrier.

Solid state devices for the detection and measurement of various forms of electromagnetic radiation and charged elementary particles are known. A typical solid state radiation detector element may employ a diode that generates an electrical pulse with an amplitude proportional to the ionization density induced in a semiconductor by incident particles. The electrical pulses generated by the diode are organized into a pulse height distribution, which is then analyzed to yield information about the incident radiation.

It is becoming increasingly important to characterize fast-neutron radiation fields. The medical community is now concerned with the tissue damage induced by exposure to fast neutrons. For instance, the fast neutron contamination associated with the use of high-energy medical accelerators requires careful monitoring so that the biological significance of radiation on the eyes and other organs of the body can be assessed.

Several fast-neutron detecting devices have been developed. In order for the dosage received by a body to be properly assessed it is necessary to determine the energy spectrum of the neutron radiation field. In a spectrometer application, the neutron energy distribution is displayed directly. In a dosimeter application, the distribution is integrated to determine the total energy per unit time contributed by the neutron radiation. Neutron spectrometer/dosimeters have generally been rather bulky in comparison with the detectors available for other forms of radiation.

Daniels et al, U.S. Pat. No. 4,217,497 presents an example of one of the more moderately sized devices. Daniels utilizes an organic scintillation detector optically coupled to a photomultiplier. Incident neutrons collide with hydrogen nuclei in the organic scintillator to produce recoil protons, which induce scintillations in the scintillator. The scintillations are optically applied to the photomultiplier which converts them to electrical pulses and amplifies the electronic pulses. A pulse shape discriminator, a multichannel analyzer, and a microcomputer are used to convert the pulse data for spectrometer applications. However, the incorporation of optical couplings and tube-type electronics limits the compactness of the device.

It is also known, as in Kobayashi et al. U.S. Pat. No. 4,210,805, how to detect ionizing radiation with a semiconductor crystal and a barrier layer formed with a metal layer. Slow neutrons have been detected with semiconductor devices having a coating, as of boron, to generate ionizing radiation from incident slow neutrons; see, e.g., Ross U.S. Pat. No. 3,227,876. It is also known how to detect slow neutrons with an organic semiconductor coated with lithium, which captures the slow neutrons and thereupon produces ionizing radiation that is detected as it traverses the semiconductor.

The primary problem in detecting fast neutrons is their great penetrating power. Having no electrical charge, they interact only slightly with atomic electrons in matter, giving up negligible energy to ionization. Because they do not ionize readily, fast neutrons have not been susceptible to detection using the conventional semiconductor technology utilized in measuring charged particle and electromagnetic radiation. A second problem is the differentiation of the fast neutrons from thermal neutrons and other forms of radiation so that the fast neutron field can be accurately assessed.

SUMMARY OF THE INVENTION

In accordance with the present invention, a solid state fast-neutron detector and a dosimeter/spectrometer incorporating the detector are presented. Fast neutrons incident on a semiconductor substrate of the detector indirectly ionize the semiconductor material wia nuclear recoil so as to produce electrical pulses, the amplitudes of which are proportional to the ionization densities induced in the substrate. A pulse height analyzer and a microcomputer convert the electrical pulses into a neutron energy spectrum and/or a dosage reading as required. Solid state readout devices may be incorporated.

The present invention involves a detector with a substrate of organic semiconductor material. A rectifying Schottky barrier is formed between an organic semiconductor substrate and a cathodic coating of a nuclearly inert metal having a Fermilevel greater than that of the substrate. A nuclearly inert metal is a metallic element having a relatively low neutron capture cross section and/or one which upon capturing a slow neutron does not relatively promptly emit ionizing radiation. Such metals are those having nuclei at least as heavy as sodium nuclei. This excludes materials such as boron and lithium as used in the above mentioned detectors. A nuclearly inert coating is selected to minimize distortion of the detector response due to slow neutrons.

Coatings are applied to opposing sides of the organic semiconductor substrate to provide electrical contacts for the device. One of these coatings functions as an anode when the device is in operation and is, accordingly, referred to hereinafter as the "anodic coating". Similarly, the other coating is referred to as the "cathodic coating." An electric field established within the semiconductor in conjunction with the formation of the Schottky barrier may be supplemented by the selection of an anodic coating with a relatively low Fermilevel, and/or by the attachment of a power supply. In order that greater sensitivity may be achieved, multi-substrate embodiments are presented.

The amplitude of the electrical pulse is proportional to the ionization density within the substrate. A pulse height analyzer can be used to obtain a pulse amplitude distribution that can be converted by a microcomputer to yield a neutron energy distribution and/or a dosage reading on solid state readout devices, as desired. The spectrometer/dosimeter may be calibrated in known neutron radiation fields.

Other objects and advantages of the present invention will become apparent from the following detailed description, particularly when taken in conjunction with the accompanying drawings.

DESCRIPTION OF THE PREFERRED EMBODIMENT

Figure 1:
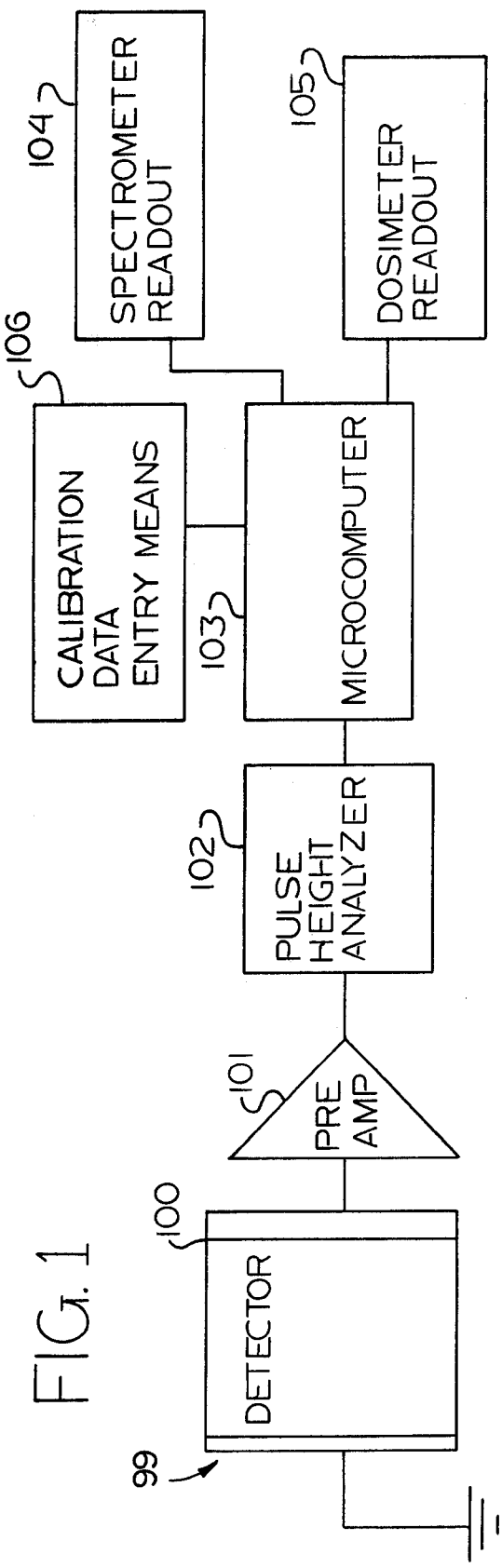
FIG. 1 is an illustration, partly diagrammatic, of one form of a fast-neutron spectrometer/dosimeter in accordance with the present invention.

In accordance with the present invention, a solid state fast-neutron spectrometer/dosimeter 99 incorporates a novel fast-neutron detector 100, as illustrated schematically in FIG. 1. The spectrometer/dosimeter comprises the detector 100, a preamplifier 101, a pulse height analyzer 102, a microcomputer 103, and appropriate readout devices such as a spectrometer readout device 104 and a dosimeter readout device 105.

The detector 100 generates electrical pulses in response to incident fast neutrons. The preamplifier 101 may be incorporated so that the electrical pulses may be amplified to facilitate further processing. The pulses are organized into a pulse height distribution by the pulse height analyzer 102. The resulting distribution is then converted by the microcomputer 103, utilizing known statistical transformations, to yield a neutron energy spectrum and/or a total fast-neutron energy dosage reading. Calibration data entry means 106 may be included to allow data collected from known fast-neutron radiation fields to be entered into the microcomputer to calibrate the spectrometer/dosimeter.

Solid state spectrometer/dosimeters for forms of radiation other than fast neutrons are known. In the devices noted above, a diode, or photodiode, generates electrical pulses in response to ionization within a substrate of semiconductor material, the ionization being generated by incident radiation of a type the device is designed to measure. In part due to the penetrating power of electrically neutral fast neutrons, an analogous device for fast-neutrons has not been satisfactorily developed.

The present invention, utilizing recent developments in organic semiconductor technology, provides a novel detector permitting the construction of a solid state fast-neutron spectrometer/dosimeter that shares the advantages previously available in devices designed to detect other forms of radiation. The detector 200, illustrated in FIG. 2, may be characterized as a Schottky diode having an organic semiconductor substrate 210, a nuclearly inert cathodic coating 220 of a metal with a Fermilevel greater than that of the substrate, the coating 220 being applied to one surface of the substrate, and an anodic coating 230 applied to the opposite surface of the substrate. The organic semiconductor material provides protons that can serve as ionizing particles when bombarded by incident fast neutrons so that electrical pulses can be generated by the detector. A nuclearly inert metal, on the other hand, has a relatively small tendency to release ionizing particles upon bombardment by thermal neutrons; this property provides the strong insensitivity to thermal neutrons so that the accuracy of the fast-neutron detector is enhanced.

The junction 240 between the cathodic coating and the organic semiconductor substrate forms a Schottky barrier, which in this case is rectifying in that the flow of positive charge carries across the junction is inhibited. The formation of the Schottky barrier results in an electric field being established across a depletion region 250 of the substrate pointings in the direction of the anodic coating.

During the operation of an incorporating spectrometer/dosimeter, a percentage of incident neutrons collide with hydrogen nuclei in the organic semiconductor substrate 210 generating recoil protons. The recoil protons, being relatively heavy charged particles, readily ionize atoms within the depletion region 250 along the paths traversed. Positive and negative charges are carried by the electric field within the substrate to their respective electrodes, generating an electrical pulse. The electrical pulses so generated are processed as described above to yield spectrometer/dosimeter readings.

A percentage of fast neutrons entering the organic substrate 210 collide with hydrogen nuclei of the organic semiconductor material generating recoil protons. The charged protons ionize along their path through the depletion region 250. The charges resulting from the ionization flow under the force of the electric field within the depletion region toward the coatings 220 and 230, resulting in an output from the detector in the form of an electrical pulse. The amplitude of an electrical pulse is proportional to the total ionization within the depletion region resulting from an associated incident neutron.

Figure 3:
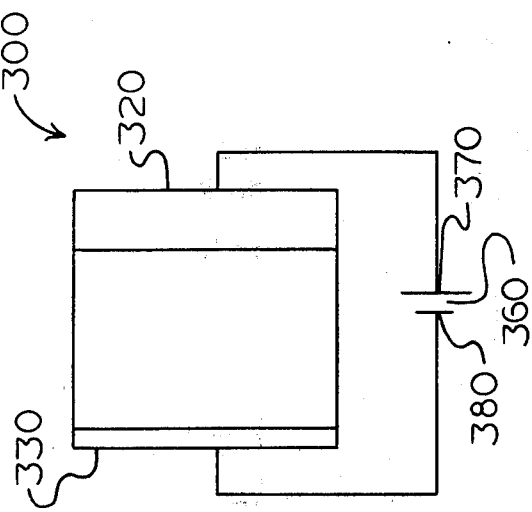
FIG. 3 is an illustration of an alternative form of a fast-neutron detector in accordance with the present invention.
Figure 4:
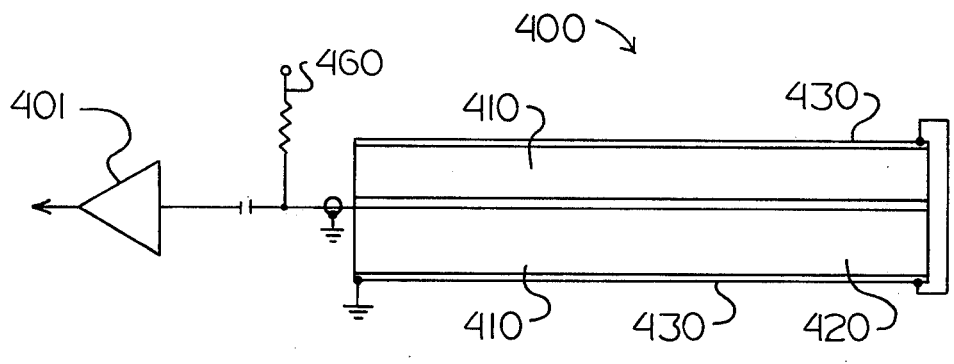
FIG. 4 is an illustration, partly diagrammatic, of another form of a fast-neutron detector in accordance with the present invention.

The sensitivity of the detector is in part a function of the total volume of the depletion region. The depletion region of a detector 300 may be enlarged by supplementing the electric field by means of a power supply 360 as shown in FIG. 3. Sensitivity may also be enhanced by sandwiching several substrates together as in multi-substrate detectors 400, illustrated in FIG. 4, and 500, illustrated in FIGS. 5 and 6. These multi-substrate detectors are described in greater detail below.

Figure 2:
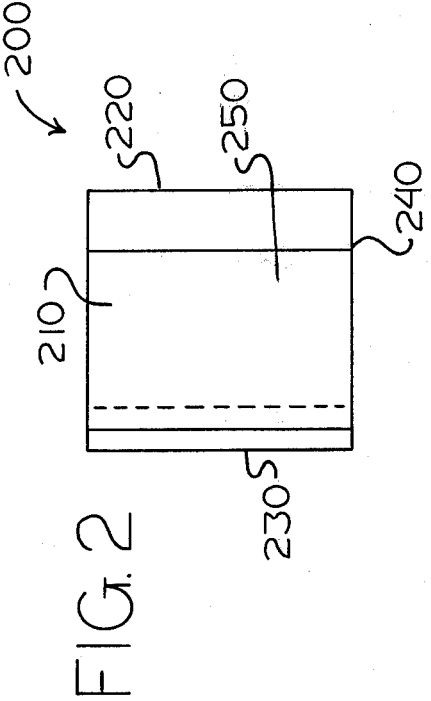
FIG. 2 is an illustration, partly diagrammatic, of one form of a solid state fast-neutron detector in accordance with the present invention and useful in the device illustrated in FIG. 1.

The preferred single-substrate detector 200 is now discussed in greater detail, reference being made to FIG. 2. The detector comprises a substrate 210, a cathodic coating 220 and an anodic coating 230. The substrate is of an organic semiconductor material. The trans isomer of polyacetylene is the preferred organic semiconductor material. Its structure is described in Chieng, C. K., et al., "Conducting Polymers: Halogen Doped Polyacetylene," J. Chem. Phys., 69: 5089–5104 (1978). Other candidate materials are polyparaphenylene and polypyrole. Current research is directed toward the development of new organic semiconductor materials, some of which may prove applicable to the present invention. The preferred polyacetylene substrate thickness is 0.140 mm thick.

The cathodic coating 220 is of a nuclearly inert metal with a Fermilevel greater than that of the substrate material. The Fermilevel differential achieves the formation of a rectifying Schottky barrier between the substrate 210 and the cathodic coating. Sodium, potassium and indium are preferred cathodic materials. Sodium and potassium, due to their reactive nature, must be protected from the atmosphere; accordingly, the detector may be encased in plastic (not shown). The preferred cathodic coating is 0.050 mm thick.

Lithium, which is a material with a relatively high Fermilevel, is not suitable due to the fact that it is nuclearly active. Lithium has a relatively high thermal neutron capture cross sections and emits ionizing radiation upon the capture of thermal neutrons; the ionizing radiation ionizes the semiconductor substrate, resulting in undesired pulses in the detector output.

The following theoretical explanation is given to facilitate the understanding of the present invention, and by no means is to be construed to limit the invention. Semiconductors are conceptualized as comprising atomic nuclei bound together by covalent bonds including electrons. At room temperature the thermal energy supplied to the semiconductor is sufficient to break some of the bonds. A bond is broken when it loses one of its electrons; the vacancy in the now incomplete bond is referred to as a "hole".

The importance of the hole is that it may serve as a carrier of electricity in the following sense. The presence of the hole makes it relatively easy for an electron of a neighboring atom to leave that atom and fill the hole. That electron leaves a hole in its initial position. In effect, a positive charge carrying hole has moved in a direction opposite the electron. This process can be repeated indefinitely, providing a mechanism for the conduction of positive charge through the semiconductor.

When a metal coating 220 is applied to a semiconductor substrate 210 so as to form a Schottky barrier, electrons flow across the junction so that the Fermilevels of the metal and the semiconductor are equalized in the region of the junction. Where the Fermilevel of the metal is greater than that of the semiconductor, the electrons will flow from the metal into the semiconductor. The cathodic coating is left with a positive charge due to the loss of electrons to the semiconductor. The positively charged cathodic coating then repels the positive charge carrying holes within the semiconductor. The repelled holes are redistributed to define a concentration gradient, with the lowest concentration adjacent the cathodic coating. While the distribution is more accurately considered a gradient, one may speak of a "depletion region" 250 of the semiconductor adjacent the cathodic coating. One result of this depletion region is the rectifying character of the junction at the cathode: positive charge collected on the cathodic coating is substantially prevented from crossing the semiconductor substrate.

When equilibrium is established in the semiconductor, the distribution of charge results in an electric field within the depletion region of the semiconductor directed toward the anodic coating. By definition of equilibrium, the electric field does not induce a net current in the semiconductor. However, the field does result in a current when the equilibrium is disturbed by ionization.

A wider depletion region provides a larger volume within the substrate which will respond to incident fast neutrons. Another advantage of having a wider depletion region, to a point, is that there is less trickle current across the semiconductor when a given depletion region width is attained by application of an external potential. This translates into less noise in the electrical output of the detector so that the neutron field can be assessed more accurately.

The width of the depletion region largely determines the volume of the substrate capable of detecting fast neutrons. The net fixed charge density, $N_D - N_A$ (donor impurity concentration minus acceptor impurity concentration), determines the depletion region width "w", which can be calculated from the voltage V (reverse bias) developed across the depletion region and the equilibrium barrier height $\phi_B$ from the equation $$w = \sqrt{\frac{\epsilon \phi_B + V + kT}{2\pi e |N_D - N_A|}}$$

where k is Boltzman's constant, T is the absolute temperature, e is the elementary charge, and $\epsilon$ is the dielectric constant for the medium.

It is apparent upon inspection of the formula that equalizing the number of positive and negative carriers will maximize the depletion width for a given voltage V and absolute temperature T. Polyacetylene normally has a small excess of positive carriers or holes. Accordingly, the substrate layer may be slightly doped by exposure to $NH_3$ or doped electrolytically with potassium to compensate for the residual p-type conductivity.

An anodic coating 230 with a relatively low Fermilevel and nuclearly inert may be used to supplement the field induced by the Schottky barrier. A metal with a relatively low Fermilevel attracts some electrons from the substrate upon being brought into contact with the semiconductor. The resulting net negative charge on the anodic coating attracts holes within the substrate 210, enlarging the depletion region 250. The result is that the electrical polarization, and, concomitantly, the magnitude of the electric field are increased. Gold, which is a good conductor and relatively inert, has a suitably low Fermilevel, and is the preferred material for the anodic coating, which may be 0.002 mm thick.

A power supply 360 may be connected across the coatings to further enlarge the depletion region and the electric field as shown in FIG. 3. The power supply should be attached in reverse bias, with the positive terminal 370 to the cathodic coating 320, and the negative terminal 380 to the anodic coating 330, so that the fields induced by the Schottky barrier and the power supply are in the same direction. This orientation will increase the positive charge of the cathodic coating and increase the negative charge of the anodic coating, so it is apparent that the magnitude of the electric field and the width of the depletion region will be increased.

There are practical limits to the width of a depletion region. Too great an applied voltage induces a current, breaking down the depletion region within the semiconductor material. The preferred 0.140 mm thickness is selected to take advantage of the greatest practically attainable depletion region in polyacetylene. A thicker substrate would wastefully add bulk without significantly improving the sensitivity of the detector.

Figure 5:
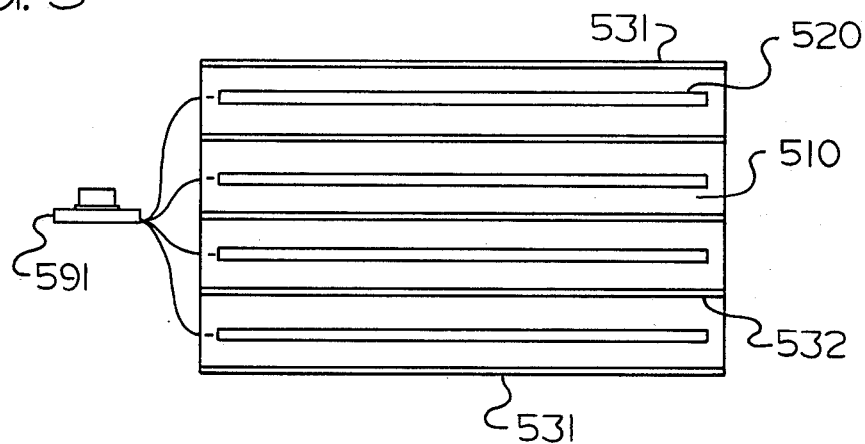
FIG. 5 is an illustration, partly diagrammatic and partly in side elevation, of still another alternative form of a detector in accordance with the present invention.
Figure 6:
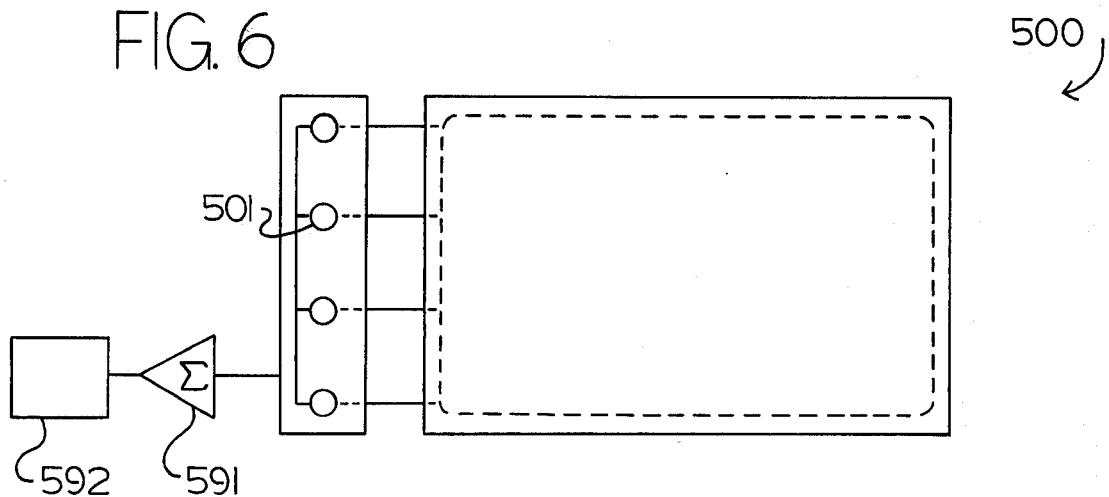
FIG. 6 is an illustration, partly diagrammatic and partly in plan view, of the detector of FIG. 5.

The number of neutrons detected is a function of the total depletion region volume. Multi-substrate detectors, such as those illustrated in FIGS. 4, 5 and 6, provide greater total detector volume while allowing thin individual substrates. Thus, the multi-substrate detectors permit greater sensitivity in the incorporating spectrometer/dosimeter.

Some of the preferred cathodic coating materials, such as sodium and potassium, are highly reactive. Accordingly, a multi-substrate detector may comprise an even number of substrates so that the cathodic coatings may each be protected by two adjacent substrates, obviating the need for a separate plastic coating.

A double-substrate detector 400, illustrated in FIG. 4, has two substrates 410 with a nuclearly inert cathodic coating 420 therebetween. The cathodic coating is applied so that a rectifying barrier is formed within each of the substrates adjacent the cathodic coating. Anodic coatings are applied to the other surface of each of the two substrates. The anodic coatings may be electrically integrated with one another by means not shown. In some applications it may be most convenient to use the outer anodic coating as the ground in the detector circuit. Since the neutron detection capability of the detector is a function of the total volume of the depletion regions within the two substrates, the double substrate embodiment represents an improvement in detector sensitivity over the single substrate detector embodiment. A further advantage of the sandwich design is that the cathodic coating is protected from chemical interactions with the surrounding atmosphere by the adjacent substrates.

In the preferred double-substrate embodiment, the preferred thicknesses are: 0.140 mm for each substrate 410, 0.050mm for each cathodic coating 420, and 0.002 mm for each anodic coating 430. These dimensions yield a total detector thickness of only 0.384 mm.

A multi-substrate detector 500, illustrated in FIGS. 5 and 6, comprises eight substrates 510, defining seven boundaries 590 therebetween. Anodic coatings 531 are applied to the outer surfaces of each of the two outermost substrates. Additionally, cathodic coatings 520 and anodic coatings 532 are alternately distributed among the boundaries so that each substrate interfaces with exactly one anodic coating and exactly one cathodic coating. Each cathodic coating 520 is of nuclearly inert material with a Fermilevel greater than that of the substrate material; each cathodic coating forms a rectifying barrier with each of the two substrates 510 adjacent thereto.

The preferred multi-substrate detector incorporates the same dimensions for the individual layers as the double-substrate embodiment, yielding in the former case a detector thickness of about 1.3 mm. Accordingly, the multi-substrate detector allows relatively large total reactive substrate volume so that the sensitivity of an incorporating spectrometer/dosimeter may be enhanced.

Note that each cathodic coating 520 is protected from the ambient atmosphere by two adjacent substrates 510, so that chemical interactions with reactive cathodic coating materials may be limited. If desired a hydrocarbon seal could be place around the entire detector for environmental protection without any loss of efficiency. Alternatively, the detector array used could be encased in a metal enclosure under vacuum or inert atmosphere.

The multi-substrate detector could be implemented so that the charge pulse from each substrate in the stacked array is received, amplified, and discriminated by one of the preamplifier/amplifier/discriminator hybrid integrated circuits 501 located on an adjacent circuit board. These miniature circuits are recently available from a few companies and are being constantly improved. The logic pulse outputs of the chips may be summed in a summing unit 591 and scaled in a scaler 592.

The multi-substrate detectors operate in a manner similar to that of the single substrate detector when incorporated within a spectrometer/dosimeter 99. Referring again to FIG. 1, the electrical pulses produced by the detector 100 in response to incident fast neutrons may be amplified by a preamplifier 101 and applied to a pulse height analyzer 102.

The pulses are stored according to amplitude by the pulse height analyzer 102, thereby converting the series of individual pulses into a pulse height distribution. However, the pulse height distribution does not directly reflect the fast-neutron radiation field, as may be understood from the following theoretical explanation, which is not to be construed in any way as a limitation on the present invention.

Due to the penetrating power of neutrons, many of the neutrons incident the substrate do not result in a pulse. Of those neutrons that do result in a pulse, many pass only a variable portion of their energy to the recoil protons. Likewise, only a variable fraction of the energy of the recoil protons contributes to ionization. Thus, there is no one-to-one relationship between neutron energy and ionization density, and, hence, pulse amplitude.

Since, as discussed above, there is no one-to-one relationship between incident neutron energy and recoil proton energy, and between recoil proton energy and ionization density within the substrate, the pulse height distribution cannot be converted directly into a neutron energy spectrum. However, there is a positive statistical relationship between the neutron energy spectrum and the pulse height distribution, which can be unfolded by a microcomputer programmed according to known techniques. The microcomputer may also be used to integrate over the neutron energy spectrum to obtain the total neutron energy dosage of the field in dosimeter applications.

Preferably, such device configuration is calibrated in known fields. Data entry means 106 may be provided to enter calibration data into the microcomputer 103 to allow the more accurate unfolding of the pulse height distribution.

For spectrometer applications, the neutron energy spectrum is simply read out on suitable display devices. For dosimeter applications, the microcomputer 103 simply integrates the neutron energy spectrum to obtain the total energy dosage of the neutron radiation field. In either case, solid state readout devices 105 and 106 may be employed; additionally, hard copy readouts could be provided. Thus, in accordance with the present invention a solid state fast-neutron detector is presented which may be incorporated in a fast-neutron spectrometer/dosimeter 99. In this manner, a compact and convenient solid-state fast-neutron spectrometer/dosimeter is realized in accordance with the present invention.

It is apparent that many modifications could be made on the present invention. For example, different materials could be used other than those listed as preferred. Also, the spectrometer and dosimeter applications need not be combined. Other modifications may be made without departing from the spirit and scope of the present invention.

What is claimed is:

1. A solid state fast-neutron detection system comprising:

a substrate of organic semiconductor material;

a conductive cathodic coating on one surface of said substrate, said cathodic coating being of a nuclearly inert metal having a Fermi level greater than the Fermi level of the material of the substrate, said cathodic coating being applied so that a rectifying barrier is established at the junction between said substrate and said cathodic coating to develop a depletion region within said substrate;

a conductive anodic coating of metal on an opposing surface of said substrate;

electronic means coupled to said anodic and cathodic coatings for producing electrical pulses of magnitude systematically related to ionization produced in said depletion region by incident radiation; and pulse height discrimination means for discrimination in favor of such electrical pulses corresponding to ionization occasioned by proton recoil upon incident fast neutron radiation and against lesser electrical pulses.

2. The detector of claim 1 further characterized in that the anodic coating is of a metal having a relatively low Fermilevel.

3. The detector of claim 1 further comprising a power supply with the positive terminal connectied to said cathodic coating and the negative terminal connected to said anodic coating.

4. The detector of claims 1, 2 or 3 further characterized in that the semiconductor is of trans isomer of polyacetylene, the anodic coating is of gold, and the cathodic coating is a metal selected from the group consisting of sodium, potassium and indium.

5. A multi-substrate fast-neutron detector comprising:

a predetermined even number of substrates, arranged side by side, including two outermost substrates each having one outer surface, said substrates defining boundaries between adjacent surfaces of said substrates, the number of boundaries being one less than the predetermined number, said substrates being of organic semiconductor material;

a plurality of nuclearly inert metallic coatings, including anodic and cathodic coatings, each cathodic coating having Fermilevel greater than that of the organic semiconductor material of the substrate, each cathodic coating being applied so that a rectifying barrier is formed with each of the two substrates adjacent thereto, one anodic coating being located upon each of the outer surfaces of the two outermost substrates, said coatings being arranged so that each substrate is adjacent to exactly one cathodic coating and exactly one anodic coating.

6. The detector of claim 5 further characterized in that the organic semiconductor material is polyacetylene, each anodic coating is of gold, and each cathodic coatings is of a material selected from the group consisting of sodium, potassium, and indium.

7. A solid state fast-neutron spectrometer comprising:

a detector having a substrate of organic semiconductor material, a cathodic coating on one surface of said substrate, said cathodic coating being of a nuclearly inert metal having a Fermilevel greater than the Fermilevel of the material of the substrate so that a rectifying barrier is established at the junction between said substrate and said cathodic coating, and an anodic coating on an opposing surface of said substrate;

pulse height analyzing means for converting respective electrical pulses generated by said detector into a pulse height distribution;

computing means for statistically unfolding the pulse height distribution to obtain a neutron energy spectrum of a fast-neutron field about the detector, said computing means including means for entering calibration data so that the spectrometer may be calibrated in known fields; and means for displaying the neutron energy spectrum generated by said computing means.

8. A solid state fast-neutron dosimeter comprising:

a detector having a substrate of organic semiconductor material, a cathodic coating on one surface of said substrate, said cathodic coating being of a nuclearly inert metal having a Fermilevel greater than the Fermilevel of the material of the substrate so that a rectifying barrier is established at the junction between said substrate and said cathodic coating, and an anodic coating on an opposing surface of said substrate;

pulse height analyzing means for converting respective electrical pulses generated by said detector into a pulse height distribution;

computing means for statistically unfolding the pulse height distribution to obtain a neutron energy spectrum of a fast-neutron field about the detector, and for integrating the neutron energy spectrum to obtain a total neutron energy dosage, said computing means including means for entering calibration data so that the dosimeter may be calibrated in known fields; and means for displaying the neutron energy dosage generated by said computing means.

* * * * *

UNITED STATES PATENT AND TRADEMARK OFFICE
CERTIFICATE OF CORRECTION

PATENT NO. : 4,445,036
DATED : April 24, 1984
INVENTOR(S) : Wade E. Selph

It is certified that error appears in the above-identified patent and that said Letters Patent is hereby corrected as shown below:

Column 2, line 17, "wia" should read --via--.

Column 2, lines 30 and 52, column 3, line 65, column 4, lines 66 and 67, column 5, lines 8 and 38, column 6, lines 28 and 29, 31 and 39, column 7, line 40, column 9, lines 24 and 45, and column 10, lines 12, 13, 33 and 34, "Fermilevel" should read --Fermi level--.

Column 4, line 12, "carries" should read --carriers--.

Column 4, line 15, "pointings" should read --pointing--.

Column 5, line 36, "Fermilevels" should read --Fermi levels--.

Column 8, line 40, "such" should read --each--.

UNITED STATES PATENT AND TRADEMARK OFFICE
CERTIFICATE OF CORRECTION

PATENT NO. : 4,445,036
DATED : April 24, 1984
INVENTOR(S) : Wade E. Selph

It is certified that error appears in the above-identified patent and that said Letters Patent is hereby corrected as shown below:

Column 9, line 26, Claim 3, "connectied" should read --connected--.

Signed and Sealed this

Fifteenth Day of January 1985

[SEAL]

Attest:

Attesting Officer

GERALD J. MOSSINGHOFF

Commissioner of Patents and Trademarks